United States Patent [19]

Bauer et al.

[11] Patent Number: 5,367,635
[45] Date of Patent: Nov. 22, 1994

[54] NETWORK MANAGEMENT AGENT WITH USER CREATED OBJECTS PROVIDING ADDITIONAL FUNCTIONALITY

[75] Inventors: Neal Bauer, Loveland; Mark A. Kepke, Ft. Collins, both of Colo.

[73] Assignee: Hewlett-Packard Company, Palo Alto, Calif.

[21] Appl. No.: 752,152

[22] Filed: Aug. 29, 1991

[51] Int. Cl.$^5$ .............................................. G06F 13/00
[52] U.S. Cl. ............................ 395/200; 395/425; 395/600; 395/650; 395/700; 395/775; 364/DIG. 1; 364/221; 364/222.81; 364/222.82; 364/280; 364/280.2; 364/280.3; 364/284
[58] Field of Search ...................... 395/600; 364/280.9, 364/280.3, 280.2

[56] References Cited

PUBLICATIONS

Individuals connected with Columbia University; "Kermit"; Screen prints of computer program.
Novell, Inc.; *Net Wave Version 3.11 System Administration*, Novell, Inc., 1991.
Simrin; *The MS-DOS Bible*; Howard Sams & Co.; pp. 389-390.
IEEE Communications Magazine, vol. 29, No. 7, Jul. 1991, pp. 29-38, N. Modiri "An Implementation . . . Information Service Element Interfaces".
The Simple Book: An Introduction to Management of TCP/IP-Based Internets, 1991, pp. 69-244, Marshall T. Rose.
IRE WESCON Convention Record, vol. 35, Nov. 1991, pp. 190-195, S. R. Reasoner, "Management by Proxy Agent".

*Primary Examiner*—Thomas M. Heckler
*Assistant Examiner*—J. Hall Backenstose
*Attorney, Agent, or Firm*—Augustus W. Winfield

[57] ABSTRACT

A computer network management software agent which includes the ability for users to add new user defined management objects. A user editable text file defines object identifications, object types, and the path and name of associated executable software. A user can then invoke user defined executable software at a managed node by sending a network command and a user defined associated object identifier to the agent in the managed node. Data can be sent between a user and user defined executable software. A timeout feature generates an error if commands are not completed within a user defined time.

1 Claim, 6 Drawing Sheets

```
An example agent configuration file would contain:
CUSTOMER-XYZ DEFINITIONS ::= BEGIN private         OBJECT IDENTIFIER ::= { iso(1) org(3) dod(6) internet(1) 4 }   302
enterprises     OBJECT IDENTIFIER ::= { private 1 } company-xyz     OBJECT IDENTIFIER ::= { enterprises 58 }
xyzprinter      OBJECT IDENTIFIER ::= { company-xyz 1 }
xyzusers        OBJECT IDENTIFIER ::= { company-xyz 2 } printerstatus   OBJECT-TYPE                                                    304
                SYNTAX  INTEGER {
          312           up(1)
                        down(2)
                }
                ACCESS  read-write
                STATUS  mandatory
                DESCRIPTION
                   308  "status of the laser printer
                        READ-COMMAND: /usr/local/bin/printer_status
                   310  READ-COMMAND-TIMEOUT: 10
      306               WRITE-COMMAND: /usr/local/bin/change_printer_status
                   314  WRITE-COMMAND-TIMEOUT: 2"
    ::= { xyzprinter 1 }
```

```
printertype    OBJECT-TYPE
               SYNTAX       OCTET STRING
               ACCESS       read-only
               STATUS       mandatory
               DESCRIPTION
                   "type of laser printer
                   READ-COMMAND: /usr/local/bin/printer_type
                   READ-COMMAND-TIMEOUT: 5"           ⎫
                                                     ⎬ 316
    ::= { xyzprinter 2 }                             ⎭ user-logins    OBJECT-TYPE
               SYNTAX       OCTET STRING
               ACCESS       read-only
               STATUS       mandatory
               DESCRIPTION
                   "list of user login ids that are currently logged in
                   READ-COMMAND: /usr/bin/users
                   READ-COMMAND-TIMEOUT: 7"          ⎫
                                                     ⎬ 318
    ::= { xyzusers 1 }                               ⎭ numusers       OBJECT-TYPE
               SYNTAX       Gauge
               ACCESS       read-only
               STATUS       mandatory
               DESCRIPTION
                   "number of users logged in
                   READ-COMMAND: /usr/bin/users | /bin/wc -w
                   READ-COMMAND-TIMEOUT: 4"          ⎫
                                                     ⎬ 320
    ::= { xyzusers 2 }                               ⎭

END
```

Configuration Pseudo Code :

The read_configuration_file routine is executed when the agent starts up or when the agent is reconfigured.

read_configuration_file
    while ( there are objects in configuration file ) do
        /*
           read from configuration file
        */
        read object_id, syntax, access
        read read_routine, read_timeout
        read write_routine, write_timeout         /*
           save values for later use
        */
        save object_id, syntax, access, read_routine,
           read_timeout, write_routine, write_timeout
           in saved_values 402      404

```
/*
register object_id, 3 procedures, and pointer to saved_values

The procedures are internal procedures that are called by the
agent when the agent receives a SNMP request for the registered
object_id. A procedure is called when the agent receives a
GetRequest GetNextRequest, or SetRequest. The procedures are
passed in the ops parameter. The release, create, and destroy
fields of the ops parameter are not used.

Whenever the agent receives a SNMP GetRequest for object_id,
get_routine is called passing in the pointer to saved_values
(cookie).

Whenever the agent receives a SNMP GetNextRequest for object_id,
getNext_routine is called passing in the pointer to saved_values
(cookie).

Whenever the agent receives a SNMP SetRequest for object_id,
set_routine is called passing in the pointer to saved_values
(cookie).
*/
            misExport (object_id, length(object_id), (get_routine,
                       getNext_routine, set_routine), pointer to saved_values)
done
return (success)
```

FIG 4B

NETWORK MANAGEMENT AGENT WITH USER CREATED OBJECTS PROVIDING ADDITIONAL FUNCTIONALITY

FIELD OF INVENTION

This invention relates generally to computer networks, and more particularly to network management software.

BACKGROUND OF THE INVENTION

Computers may be interconnected via a local area network (LAN). Local area networks may be interconnected into still larger systems spanning a floor or building, a group of buildings (campus), a region, or larger areas on up to worldwide systems. Each LAN may have a different hardware interconnection technology and multiple network protocols. A simple isolated LAN may be administered by individual users. That is, users may change equipment, install software, and diagnose problems. Large complex LANs or large groups of interconnected LANs require "management". "Management" refers to both a human network manager and software used by the human manager. In this application, "management" refers to software for managing the overall system, and "user" refers to a person using the network management software. The user is usually the system administrator. Users can obtain management data and alter management data on the network by using network management software.

Large network systems are typically dynamic with continual requirements for addition and deletion of equipment, updating of software, and detection and analysis of problems. In general, there may be a variety of systems from a variety of vendors with a variety of system owners. Management software is designed to be as general as possible. However, as the overall system changes, the user may need information or control capabilities not anticipated by the designers of the management software. Management software needs to have a provision for adding new user defined capabilities for information gathering and control.

Current network management software is typically defined in terms of software objects. A software object is a way of organizing data. An object may have a value or associated data. An object may have an associated executable software process for generating data or for control purposes. A user can retrieve or alter the data associated with an object. Network management objects are uniquely identified by object identifiers.

An agent is software running as a background process on each of the target devices. When a user requests management data from a device on the network, management software will send an object identification in a management packet or frame to the target agent. The agent will interpret the object identification, retrieve data associated with the object identification, and send the data in a packet back to the user. Sometimes, a corresponding process may be invoked to retrieve data.

Current network management agent software is typically sold with a hierarchy of fixed pre-defined objects. There are typically no provisions for a user to add or modify objects. Some management software provides "extensible" agents. "Extensible" typically means that a user has access to source code for the agent and can modify the source code and recompile. Alternatively, the user may write additional code in a programming language which requires compilation but may not be required to recompile the original agent. In either case, writing source code in a programming language and compilation of the source code is required. There is a need for users to have the capability to add objects and associated processes without having to write code in a programming language requiring compilation.

There are numerous standards organizations which are attempting to standardize computer networking. The International Organization for Standardization (ISO) has provided a general reference framework called the Open System Interconnection (OSI) model. The OSI model for a network management protocol is called Common Management Information Protocol (CMIP). CMIP is a common network management protocol in Europe. In the United States, a more common network management protocol is a related variation of CMIP called the Simple Network Management Protocol (SNMP) (see Marshall T. Rose, *The Simple Book*, Prentice-Hall, 1991).

In the SNMP network management terminology, a network management system contains at least one network management station (NMS), several managed nodes, each containing an agent, and a network management protocol which is used by the management station and the agents to exchange management information. A user can obtain data and alter data on the network by using network management software on the NMS to communicate with agent software in the managed nodes.

Software for agents conforming to SNMP standards is commercially available. Agent source code is also available without charge from universities. For example, a source code SNMP development kit (hereinafter referred to as the "MIT code") is available from the following source:

James R. Davin
Advanced Network Architecture Group
M.I.T. Laboratory for Computer Science
545 Technology Square
Cambridge, Mass. 02139

The SNMP defines a structure for a management database (a collection of objects) called the Management Information Base (MIB). Objects in a MIB have names (OBJECT IDENTIFIERS) and data structures (OBJECT TYPES). An object identifier is a sequence of non-negative integer values which signify a path through a tree structure of numbered branches (called sub-identifiers). Each sub-identifier is a non-negative integer. For example, the object identifier 1.3.6.1.4.1.11.2.12 identifies an object found by starting at the root, moving to the branch with the sub-identifier 1, moving to a subordinate branch with the sub-identifier 3, and so forth. The first 6 levels of this example are defined by the standard model. In the example, the branch identified by the first five sub-identifiers (1.3.6.1.4) is the standard SNMP defined branch called "private". The next sub-identifier (1) is for a branch (called "enterprises") reserved for vendor specific objects. The next label (11) is reserved for Hewlett Packard.

Information is retrieved from an agent by sending a SNMP GET or GET-NEXT request with an object identification as a parameter. Data associated with an object can be altered by sending a SNMP SET request to the agent with the object identification as one parameter and the data as another parameter. An object which can be written to is called a "settable" object.

The MIT code includes a function (named "misExport()") for registering (attaching or grafting) an object to the object tree structure. There are 4 parameters as follows:

name: (the object identifier)
namelen: (the number of sub-identifiers in the object identifier)
ops: (a list of 6 routines (corresponding to the operations RELEASE, CREATE, DESTROY, and SNMP requests GET-NEXT, GET, and SET) which can be performed on management objects)
cookie: (a pointer to stored parameters associated with the specific object identifier within a data structure internal to the agent).

MIB standards evolve as required by the industry. Proposed MIB standards start as published requests for comments. A MIB format for defining objects is specified in Request For Comments number 1212 (hereinafter referred to as "RFC 1212") and an example MIB standard using that format is specified in Request For Comments 1213 (hereinafter referred to as "RFC 1213"). Both are available from the following source:

DDN Network Information Center
SRI International
Room EJ291
333 Ravenswood Avenue
Menlo Park, Calif. 94025

The RFC 1212 object-type notation requires a series of textual clauses as follows:

SYNTAX: (examples are "INTEGER" and "OCTET STRING")
ACCESS: (choices are: "read-only", "read-write", "write-only", and "not-accessible")
STATUS: (the required choice for status in a commercial product is "mandatory". In an experimental MIB, the word "optional" is allowed.)
DESCRIPTION: (A textual explanation of the object delimited by quote marks.)

As discussed above, there is a need in network management for users to have the capability of adding management objects to an agent without requiring recompilation. However, the capability must be compatible with various standards as described above.

SUMMARY OF THE INVENTION

The present invention provides a network management agent having the capability of adding new objects to the agent without requiring modification of the agent source code and without stopping and restarting the agent. These new objects can then be used by network management users to initiate user defined processes.

In the present invention, user defined objects are defined in a configuration file which is read by a network management agent. The configuration file is an editable text file which can be created at any time. The agent can be invoked to re-read the configuration file and incorporate objects in the configuration file. Then, if a request for a user defined object reaches an agent, the appropriate user defined process is initiated to acquire data, control a peripheral, or execute whatever is requested. Data is returned from the user defined process back through the agent to the user. A timeout feature generates an error if commands are not completed within a user defined time.

DETAILED DESCRIPTION OF THE PREFERRED EMBODIMENT OF THE INVENTION

Figure 1:
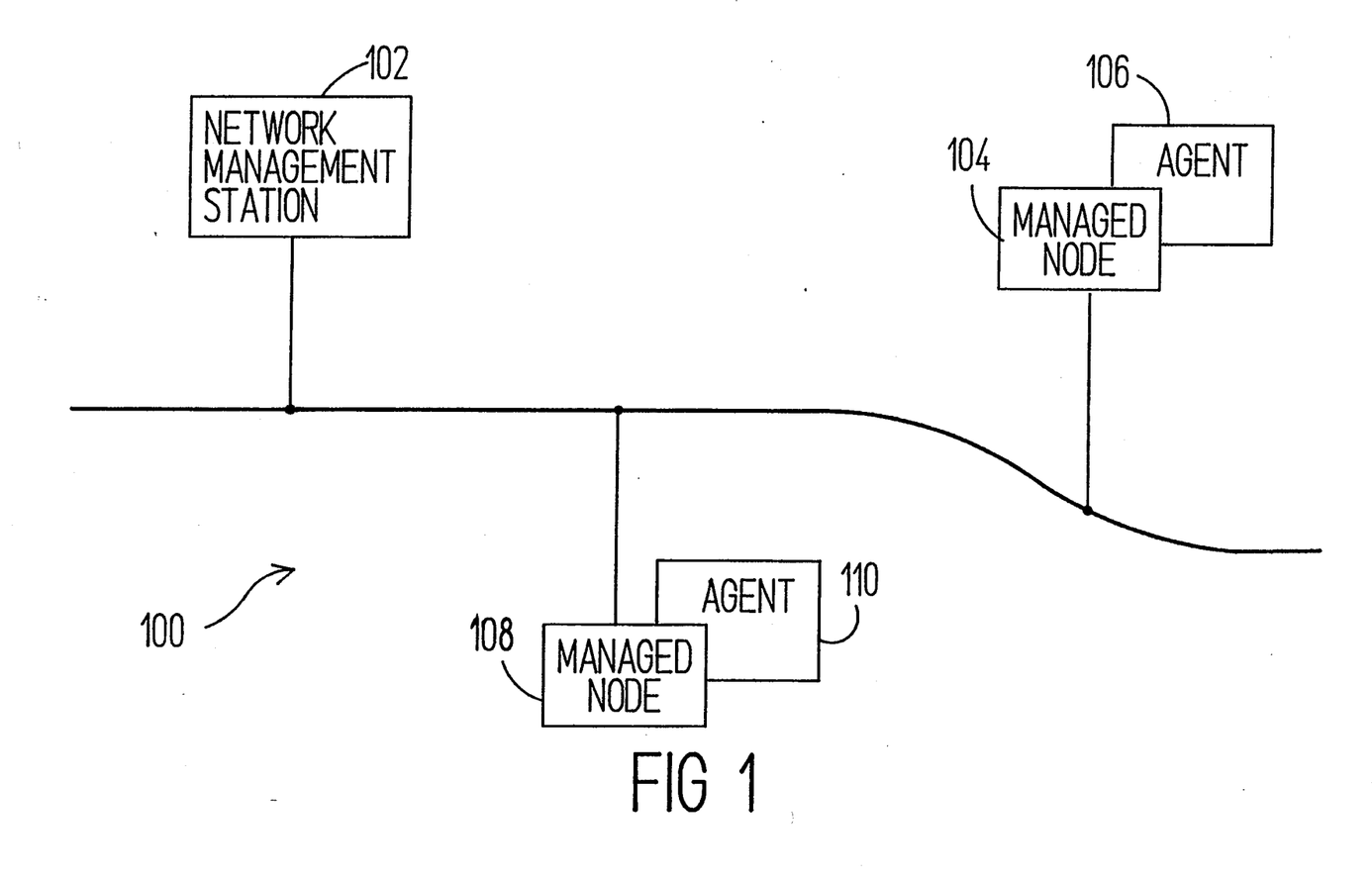
FIG. 1 is a block diagram illustrating a computer network.

FIG. 1 illustrates a computer network 100. Network management station 102 manages a variety of managed nodes 104, 108. Each managed node has an agent 106, 110 running as background software providing management information and control. Each agent 106, 110 is configured as a tree structure of software objects.

Figure 2:
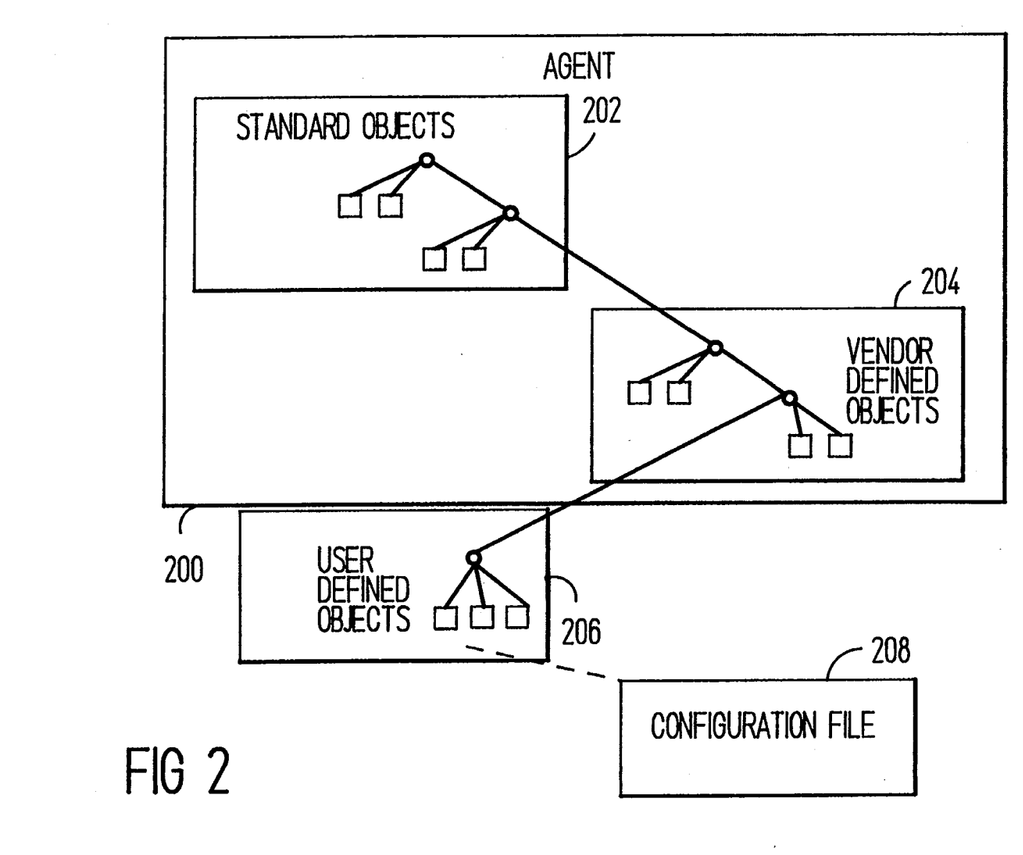
FIG. 2 is a software block diagram illustrating additional detail within an agent.

FIG. 2 illustrates additional detail within an agent. Agent 200 has a layer of standard objects 202 defined by RFC 1213, and a layer of vendor defined objects 204. Standard objects 202 and vendor defined objects 204 are compiled and supplied by the network management software vendor. The present invention comprises software within an agent 200 enabling the addition of user defined objects 206 to a previously compiled network management agent 200. User defined objects are defined in configuration file 208. Agent 200 can be invoked to re-read configuration file 208 and add user defined objects 206 to agent 200.

The preferred embodiment of the present invention is an agent conforming to the SNMP model. Much of the following structure and nomenclature is common to other standards but is presented here specifically in terms of the SNMP. The preferred embodiment of the present invention uses the MIT code for the basic core of the agent software.

The new agent in the present invention includes the capability of reading object definitions from a special file called a configuration file (208 in FIG. 2). The configuration file (208) is a text file which can be edited by a user using any text editor. The configuration file (208) can be defined at the time the new agent is installed or may be defined later. The configuration file (208) has a predefined UNIX path.

The configuration file is compatible with the RFC 1212 MIB standard described earlier. However, in the preferred embodiment, additional capability is incorporated into the textual DESCRIPTION clause. Four additional clauses are defined as follows:

READ-COMMAND: (a path and name for an executable program.)
WRITE-COMMAND: (a path and name for an executable program.)
READ-COMMAND-TIMEOUT: (an integer specifying a time in seconds allowed for completion of a READ-COMMAND.)
WRITE-COMMAND-TIMEOUT: (an integer specifying a time in seconds allowed for completion of a WRITE-COMMAND).

Figure 3A:
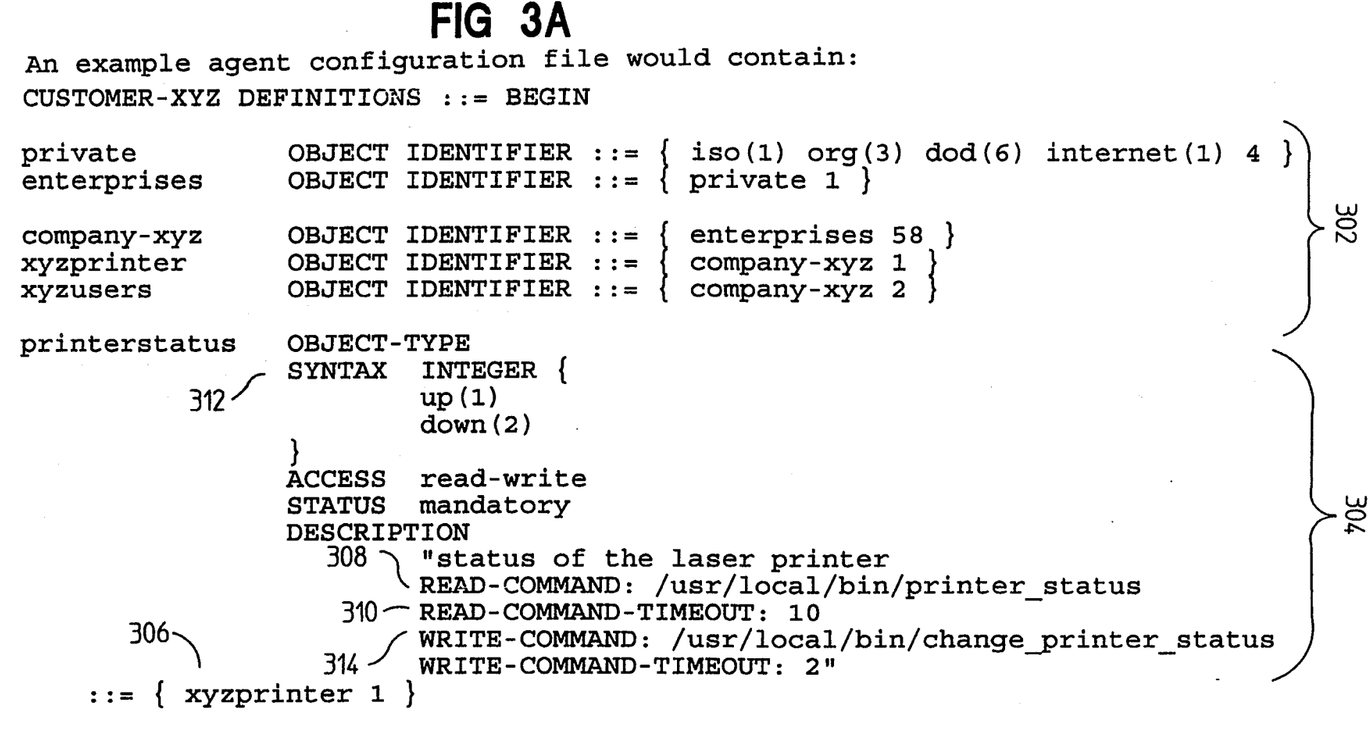
FIGS. 3A and 3B illustrate an example agent configuration file in accordance with the present invention.
Figure 3B:
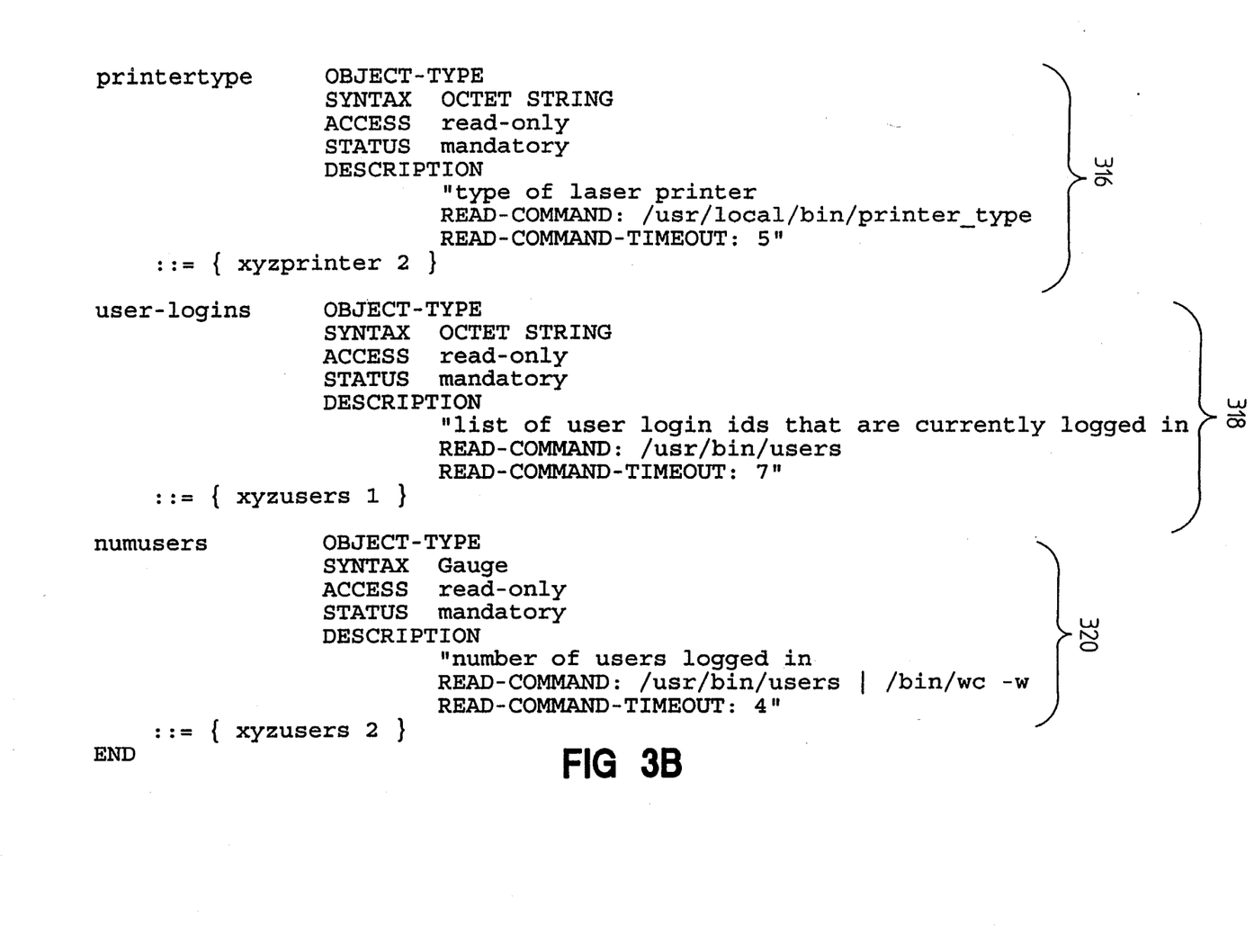

FIGS. 3A and 3B illustrate a sample configuration file. The object identifier preamble (302) defines a MIB tree structure branch common to all user defined objects. In the sample illustrated in FIGS. 3A and 3B, the common branch is 1.3.6.1.4.1.58. Then, for each defined object, the list defines a leaf which can be combined with the common branch to define each object's SNMP name (object identifier). For example, an object labeled "printerstatus" (304) defines a leaf (306) which appends the sub-identifier 1 to a branch labeled "xyzprinter" which in turn is assigned the integer 1 in the preamble (302). The complete object identifier for the user defined object labeled "printerstatus" is then 1.3.6.1.4.1.58.1.1.0. The object labeled "printerstatus" (304) could be used to turn a printer on and off and to test the status of the printer. A request to read the printer status is initiated by a SNMP GET or GET-NEXT request to the agent along with the object identifier. The agent invokes a user specified program designated in the read-command clause (308). The read-command clause (308) specifies a UNIX path/usr/local/bin/ and an executable program named "printer_status". The read-command-timeout clause (310) specifies that the agent will only wait 10 seconds for the printer_status command to respond. If the command takes longer than 10 seconds, an error message is returned to the management station. The syntax clause (312) specifies that if the printer is on line (up), the object labeled "printerstatus" returns the integer 1 to the management station. If the printer is off line (down), a 2 is returned. Likewise, a command to force the printer off line is accomplished by sending an integer argument 2 (down) to the user defined object "printerstatus" which in turn passes the argument and invokes a program named "change_printer_status" as defined in the write-command clause (314).

FIG. 3B also illustrates a read-only object labeled "printertype" (316) to return a description string identifying a printer type. Also illustrated in FIG. 3B is a read-only object labeled "user-logins" (318) to return a string containing identifications of all users currently logged onto the network. Continuing in FIG. 3B, the last example is a read-only object labeled "numusers" which returns the number of users logged onto the network.

Figure 4A:
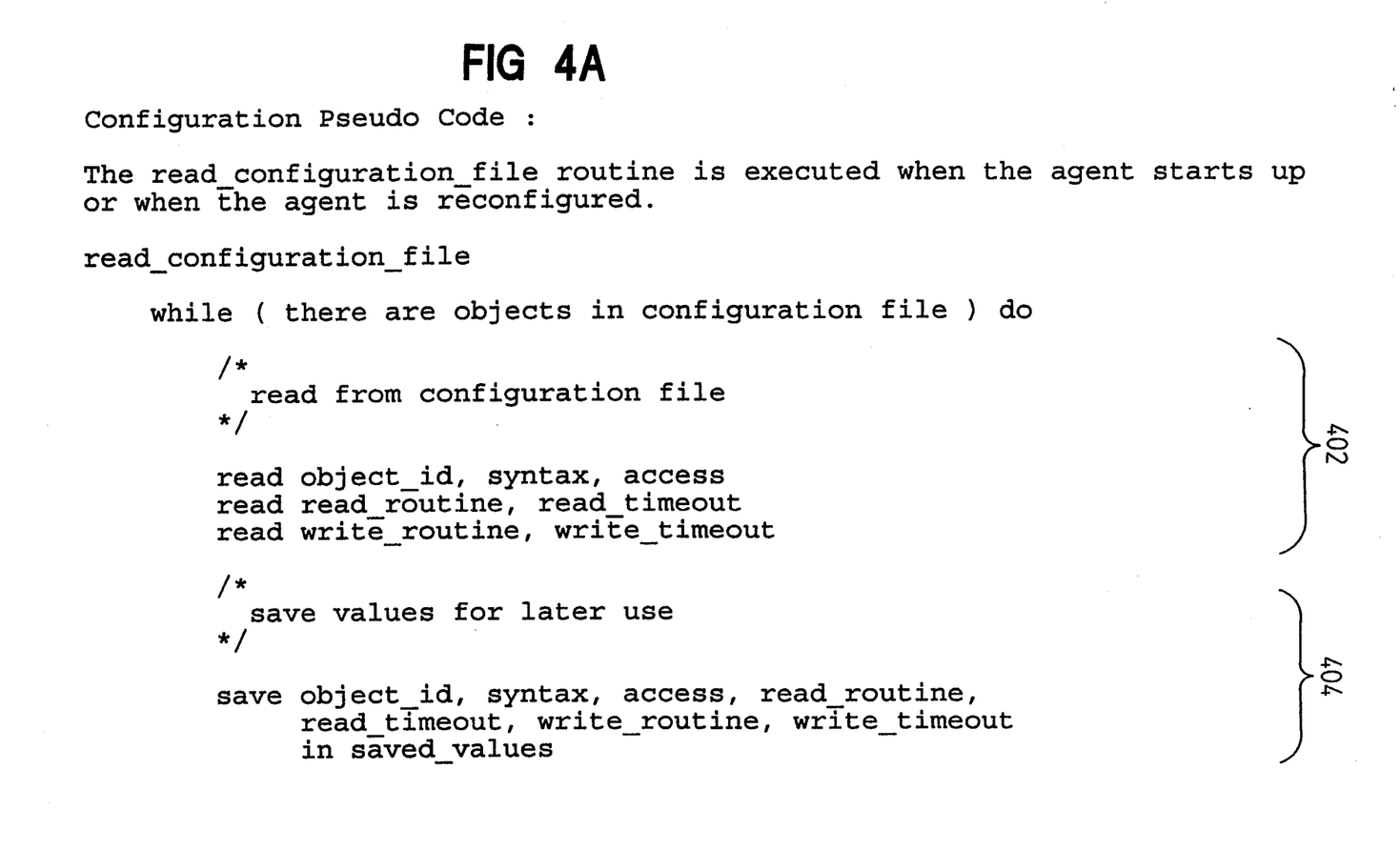
FIGS. 4A and 4B illustrate pseudocode for reading a configuration file and registering user defined objects with a vendor defined object tree structure.
Figure 4B:
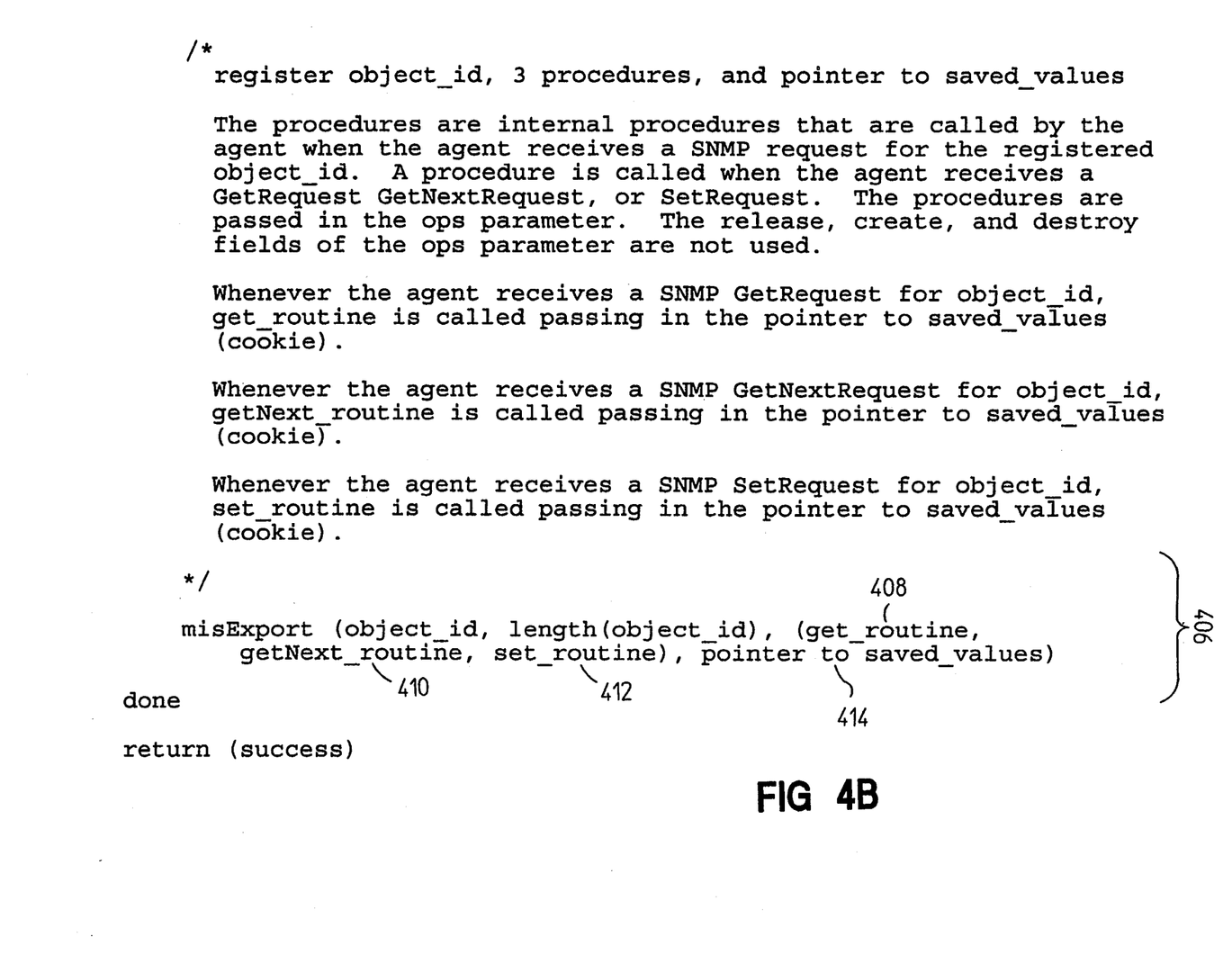

FIGS. 4A and 4B illustrate in comments and pseudo-code the code which enables an agent to read the objects described in the configuration file, to parse the special clauses within the description clause, to associate user specified executable software with a user defined object identifier, and to graft the user defined object to the primary tree structure that is defined by the vendor when the agent code is compiled. The misExport function described in the background section is called to graft the user defined object to the primary tree structure. The misExport function is executed once for each user defined object.

In FIGS. 4A and 4B, the human readable configuration file is read (402) and information associated with each object is then saved in a separate internal data structure named "saved_values" (404). Then the misExport function is called to register the object (406). The ops parameter for the misExport function requires procedure names for responding to the SNMP GET, GET-NEXT, and SET requests. In FIG. 4B, these are labeled "get_routine" (408), "getNext_routine" (410), and "set_routine" (412) respectively.

Get-routine (408) is called when a SNMP GetRequest is received by the agent for one of the objects registered from the configuration file. Get_routine (408) uses the misExport cookie parameter (414) as a pointer into an internal data structure to identify the path and name of a UNIX shell command. The UNIX shell command will execute read_routine and read_timeout (402) as specified in the original configuration file. The getNext_routine (412) and the set_routine (412) also use the cookie parameter (414) to point to a UNIX shell command which executes user specified procedures.

Once an object is defined for an agent, a user at the network management station can then request data from that agent (e.g., an integer or a string) or initiate a process within that agent (settable object). The user invokes the user-defined object by sending an SNMP request with an object identifier and appropriate data arguments to the agent containing the object.

At start-up, an agent searches for and reads the configuration file. Once the configuration file is read, the information is incorporated into the agent's memory and the actual file is no longer needed. Therefore, the file can be modified while the agent is running. Also, the file can be incorporated without requiring recompilation of the agent. After start-up, the agent can be reconfigured (forced to re-read all configuration files) by issuing an SNMP SetRequest to an object having the object identifier 1.3.6.1.4.1.11.2.13.2.2.0 and setting the value to 1. This vendor-specific settable object exists in previous Hewlett Packard UNIX versions of SNMP compatible agents. The reconfigure object first unregisters all user defined objects previously registered. Then the process of reading the configuration file and registration proceeds as described in FIGS. 4A and 4B.

From the preceding discussion, it can be seen that the present invention provides a network management agent to which a user can add new management objects. The new user defined objects can be added without requiring recompilation of the agent and can be added without stopping the agent. This capability permits the user to expand the agent's capability into areas not provided by the vendor for the agent. The agent can then be updated, or it can be modified to accommodate new software or new equipment, or it can be improved to provide management tools not contemplated by the designers of the agent.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a computer system comprising a managing computer and at least one managed computer, the managing computer and the managed computer connected by a network, the managed computer having an executable program and an agent, capable of receiving information from the managing computer, running as background software, the agent, while running, having a set of executable functions defined by a collection of management objects forming a management information base, a method for extending the set of executable functions of the running agent, the method comprising the following steps:

a. defining a new management object in a text file in the managing computer, the new management object associated with the executable program, the text file including at least one object identification and a directory path for the executable program;
b. sending the text file, over the network, from the managing computer to the managed computer;
c. sending a reconfigure command, over the network, from the managing computer to the agent;
d. receiving the reconfigure command by the agent;
e. appending the text file, by the running agent, to the collection of management objects in the running agent, in response to the reconfigure command; and f. interpreting the new management object defined by the text file as an executable function, thereby extending the set of executable functions of the running agent;

whereby, if the managing computer sends an object identification which was included in the text file over the network to the agent;
  i) the agent receives the object identification;
  ii) the managed computer executes the executable program indicated by the object identification.

* * * * *